(12) United States Patent
Matsuo et al.

(10) Patent No.: US 9,749,253 B2
(45) Date of Patent: Aug. 29, 2017

(54) TECHNIQUE FOR IMPLEMENTING A LATENCY SENSITIVE COMMUNICATION PROTOCOL IN A WIRELESS MESH NETWORK

(71) Applicant: SILVER SPRING NETWORKS, INC., Redwood City, CA (US)

(72) Inventors: Brian Matsuo, Mountain View, CA (US); Peter Hunt, Sunnyvale, CA (US); Jana Van Greunen, Woodside, CA (US)

(73) Assignee: SILVER SPRING NETWORKS, INC., San Jose, CA (US)

( * ) Notice: Subject to any disclaimer, the term of this patent is extended or adjusted under 35 U.S.C. 154(b) by 51 days.

(21) Appl. No.: 13/828,437

(22) Filed: Mar. 14, 2013

(65) Prior Publication Data

US 2014/0269647 A1 Sep. 18, 2014

(51) Int. Cl.
*H04L 12/893* (2013.01)
*H04W 80/00* (2009.01)
*H04L 12/801* (2013.01)

(52) U.S. Cl.
CPC .............. *H04L 47/40* (2013.01); *H04L 47/14* (2013.01); *H04W 80/00* (2013.01)

(58) Field of Classification Search
CPC ......... H04L 47/14; H04L 47/40; H04L 29/06; H04L 47/25; H04L 29/06027; H04W 84/12; H04W 84/18; H04W 80/00
USPC ........ 370/230, 328, 231, 310, 235, 236, 338
See application file for complete search history.

(56) References Cited

U.S. PATENT DOCUMENTS

| | | | | |
|---|---|---|---|---|
| 6,769,127 | B1* | 7/2004 | Bonomi | H04H 60/72 348/E5.008 |
| 7,787,427 | B1* | 8/2010 | Simon | H04W 40/02 370/314 |
| 2005/0086682 | A1* | 4/2005 | Burges et al. | 725/19 |
| 2006/0098613 | A1* | 5/2006 | Kish | H04N 21/6405 370/338 |
| 2006/0184462 | A1* | 8/2006 | Hawkins | G06N 3/02 706/14 |
| 2006/0222017 | A1* | 10/2006 | Quiroga et al. | 370/503 |
| 2007/0058320 | A1* | 3/2007 | Lee | H02H 1/0061 361/157 |

(Continued)

*Primary Examiner* — Michael Thier
*Assistant Examiner* — Rownak Islam
(74) *Attorney, Agent, or Firm* — Artegis Law Group, LLP (57) ABSTRACT

A wireless mesh network is configured to implement a latency-sensitive communication protocol in order to facilitate data communications between devices coupled to that network and configured to communicate with one another based on that protocol. Specifically, a node within the wireless mesh network receives a continuous stream of data that includes an N-bit sequence from an upstream device coupled to the wireless mesh network. The node transmits the N-bit sequence to a downstream node within the wireless mesh network. The downstream node re-creates the continuous stream of bits based on the received N-bit sequence, and then transmits the re-created continuous stream of bits to another device coupled to the wireless mesh network. By operating in conjunction with one another, the nodes within the wireless mesh network facilitate communication between the devices coupled to wireless mesh network according to the latency-sensitive communication protocol.

25 Claims, 5 Drawing Sheets

(56) References Cited

U.S. PATENT DOCUMENTS

| | | | | |
|---|---|---|---|---|
| 2007/0136741 | A1* | 6/2007 | Stattenfield | 725/32 |
| 2007/0217490 | A1* | 9/2007 | Blake | H04L 27/2626 |
| | | | | 375/222 |
| 2007/0264964 | A1* | 11/2007 | Birmingham | H04M 11/066 |
| | | | | 455/403 |
| 2012/0307617 | A1* | 12/2012 | Ross | G11B 20/10222 |
| | | | | 369/59.19 |
| 2013/0006909 | A1* | 1/2013 | Powlowski | G06F 7/02 |
| | | | | 706/46 |
| 2013/0153666 | A1* | 6/2013 | Edwards | G06K 7/10 |
| | | | | 235/462.25 |
| 2013/0315202 | A1* | 11/2013 | May | 370/331 |

* cited by examiner

TECHNIQUE FOR IMPLEMENTING A LATENCY SENSITIVE COMMUNICATION PROTOCOL IN A WIRELESS MESH NETWORK

BACKGROUND OF THE INVENTION

Field of the Invention

Embodiments of the present invention relate generally to wireless digital communication and, more specifically, to a technique for implementing a latency-sensitive communication protocol in a wireless mesh network.

Description of the Related Art

A communication protocol may be described as "latency-sensitive" when the robustness of that protocol depends on data packets being transmitted and/or received across a communication link with precise timing. For example, a device configured to implement a latency-sensitive communication protocol could transmit data packets across a communication link to another device with a particular data rate. The other device could continuously verify that the communication link remains active by determining that a data rate associated with received data packets meets some threshold value.

Latency-sensitive communication protocols are generally implemented on communication links that have low latency and high reliability. Low latency may be required in order to ensure the precise timing of the data packets transmitted across the communication link. High reliability may be required in order to ensure the delivery of each precisely-timed data packet. A communication link that does not have both low latency and high reliability is oftentimes unsuitable for implementing a low-latency communication protocol.

Various networks of devices currently exist that rely on latency-sensitive communication links. With the growing interconnectedness of networks across the world, there is an increasing need to couple these existing networks to other, more modern networks, thereby allowing these different networks to communicate with one another.

However, modern networks oftentimes include communication links having higher latency and lower reliability than that typically required by the latency-sensitive communication protocol implemented by the existing networks. Consequently, the existing networks may not be compatible with the modern networks.

As the foregoing illustrates, what is a needed in the art is a more effective technique for transmitting data according to a latency-sensitive communication protocol.

SUMMARY OF THE INVENTION

One embodiment of the present invention sets forth a computer-implemented method for transmitting data across a network according to a communication protocol, including receiving a first stream of bits from the first device that includes repeating instances of a first N-bit sequence, N being a positive integer, extracting the first N-bit sequence from the first stream of bits, and transmitting a first data packet that includes the first N-bit sequence to a node within the network that is coupled to the second device and is configured to transmit a second stream of bits to the second device that includes repeating instances of the first N-bit sequence.

One advantage of the disclosed technique is that devices configured to communicate with one another according to the communication protocol may be retrofitted to communicate with one another across the network, thereby reducing the bandwidth and reliability required to communicate according to that protocol.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
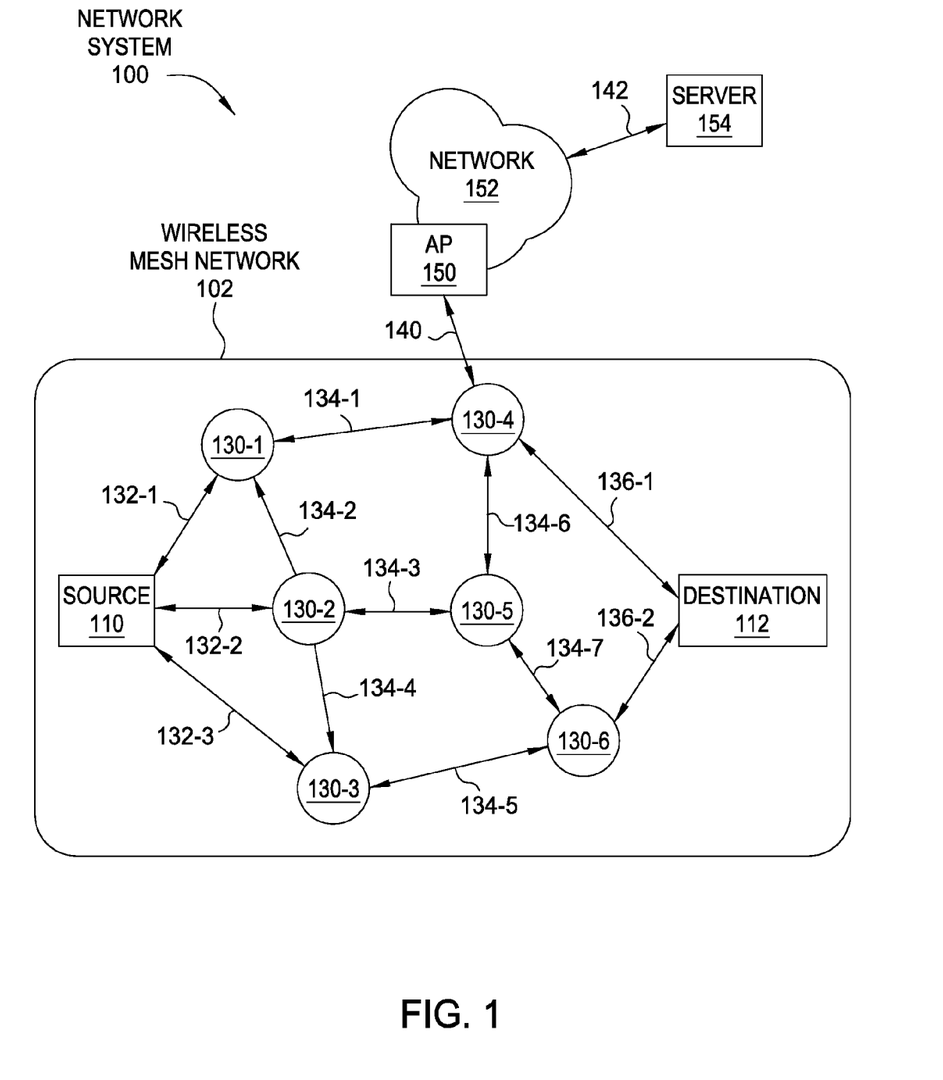
FIG. 1 illustrates a network system configured to implement one or more aspects of the present invention.

FIG. 1 illustrates a network system 100 configured to implement one or more aspects of the invention. As shown, the network system 100 includes a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, a network 152, and a server 154.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing from the scope and spirit of embodiments of the present invention.

The discovery protocol may also be implemented to determine the hopping sequences of adjacent nodes, i.e. the sequence of channels across which nodes periodically receive payload data. Once adjacency is established between the source node 110 and at least one intermediate node 130, the source node 110 may generate payload data for delivery to the destination node 112, assuming a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or Ethernet media access control (MAC) address.

Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address, and each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

In network system 100, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The network 152 is coupled to the server 154 via communications link 142. The access point 150 is coupled to the network 152, which may comprise any wired, optical, wireless, or hybrid network configured to transmit payload data between the access point 150 and the server 154.

In one embodiment, the server 154 represents a destination for payload data originating within the wireless mesh network 102 and a source of payload data destined for one or more nodes within the wireless mesh network 102. In one embodiment, the server 154 executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting.

The techniques described herein are sufficiently flexible to be utilized within any technically feasible network environment including, without limitation, a wide-area network (WAN) or a local-area network (LAN). Moreover, multiple network types may exist within a given network system 100. For example, communications between two nodes 130 or between a node 130 and the corresponding access point 150 may be via a radio-frequency local-area network (RF LAN), while communications between access points 150 and the network may be via a WAN such as a general packet radio service (GPRS). As mentioned above, each node within wireless mesh network 102 includes a network interface that enables the node to communicate wirelessly with other nodes. Each node 130 may implement the first and/or second embodiments of the invention, as described above, by operation of the network interface. An exemplary network interface is described below in conjunction with FIG. 2.

Figure 2:
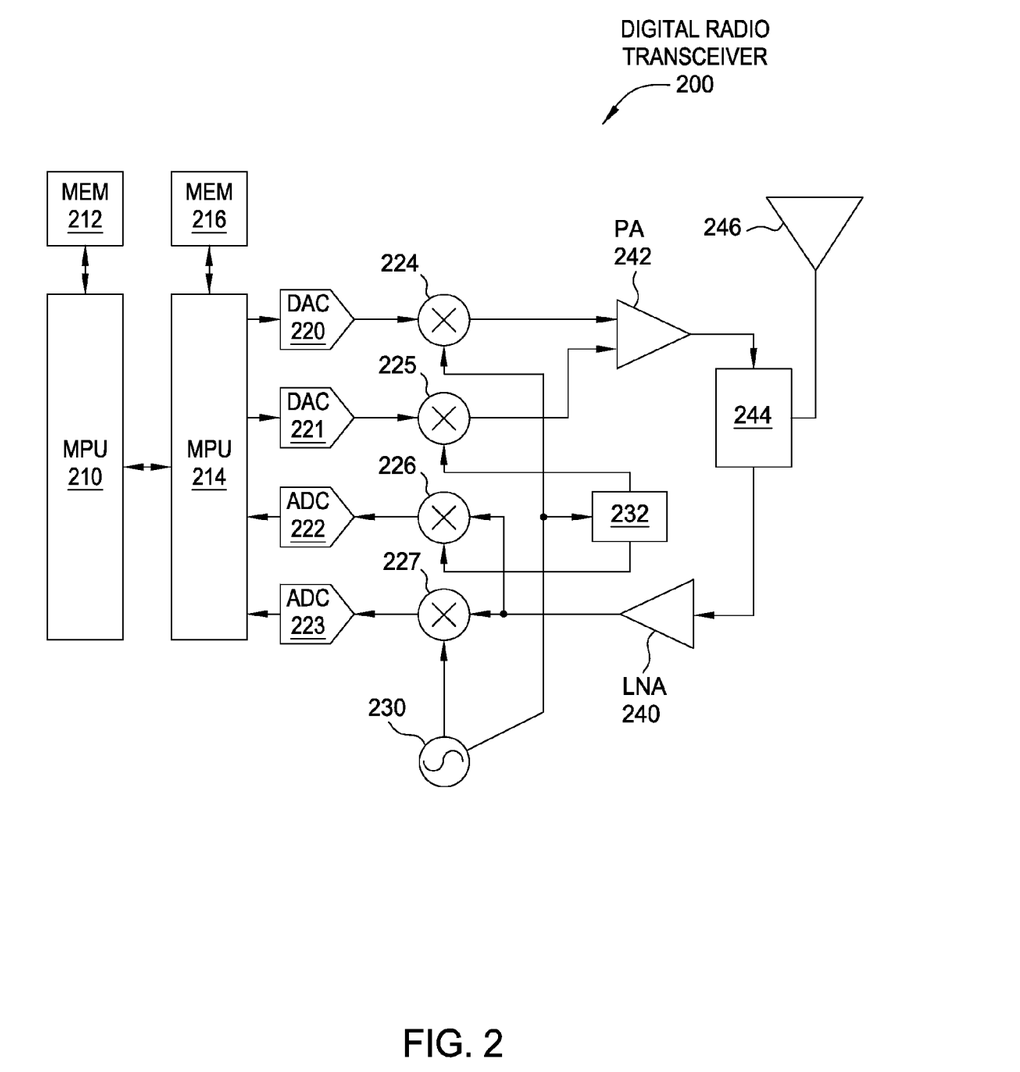
FIG. 2 illustrates a network interface configured to transmit and receive data within a mesh network, according to one embodiment of the present invention.

FIG. 2 illustrates a network interface 200 configured to implement multi-channel operation, according to one embodiment of the invention. Each node 110, 112, 130 within the wireless mesh network 102 of FIG. 1 includes at least one instance of the network interface 200. The network interface 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. A memory 212 may be coupled to the MPU 210 for local program and data storage. Similarly, a memory 216 may be coupled to the DSP 214 for local program and data storage. Memory 212 and/or memory 216 may be used to store data structures such as, e.g., a forwarding database, and/or routing tables that include primary and secondary path information, path cost values, and so forth.

In one embodiment, the MPU 210 implements procedures for processing IP packets transmitted or received as payload data by the network interface 200. The procedures for processing the IP packets may include, without limitation, wireless routing, encryption, authentication, protocol translation, and routing between and among different wireless and wired network ports. In one embodiment, MPU 210 implements the techniques performed by the node, as described in conjunction with FIGS. 1 and 3-5, when MPU 210 executes a firmware program stored in memory within network interface 200.

The MPU 214 is coupled to DAC 220 and DAC 221. Each DAC 220, 221 is configured to convert a stream of outbound digital values into a corresponding analog signal. The outbound digital values are computed by the signal processing procedures for modulating one or more channels. The MPU 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values. Persons having ordinary skill in the art will recognize that network interface 200 represents just one possible network interface that may be implemented within wireless mesh network 102 shown in FIG. 1, and that any other technically feasible device for transmitting and receiving data may be incorporated within any of the nodes within wireless mesh network 102.

Referring back now to FIG. 1, nodes 110, 112, or 130 within wireless mesh network 102 are configured to facilitate the exchange of data between two or more devices that communicate with one another according to a latency-sensitive communication protocol, as described in greater detail below in conjunction with FIG. 3. With this approach, a given node within wireless mesh network 102 may receive a continuous data stream from an upstream device and then periodically communicate portions of that data stream to a downstream node across the wireless mesh network 102, as described in greater detail below in conjunction with FIGS. 3 and 4. Further, the downstream node may then receive the portions of the data stream periodically, replicate those portions, and transmit a continuous data stream to a downstream device that includes those replicated portions, as described in greater detail below in conjunction with FIGS. 3 and 5.

By implementing the techniques described herein, a network of devices configured to communicate according to a latency-sensitive communication protocol may be retrofitted to allow more effective data communications across the wireless mesh network 102.

Implementing a Latency-Sensitive Communication Protocol

Figure 3:
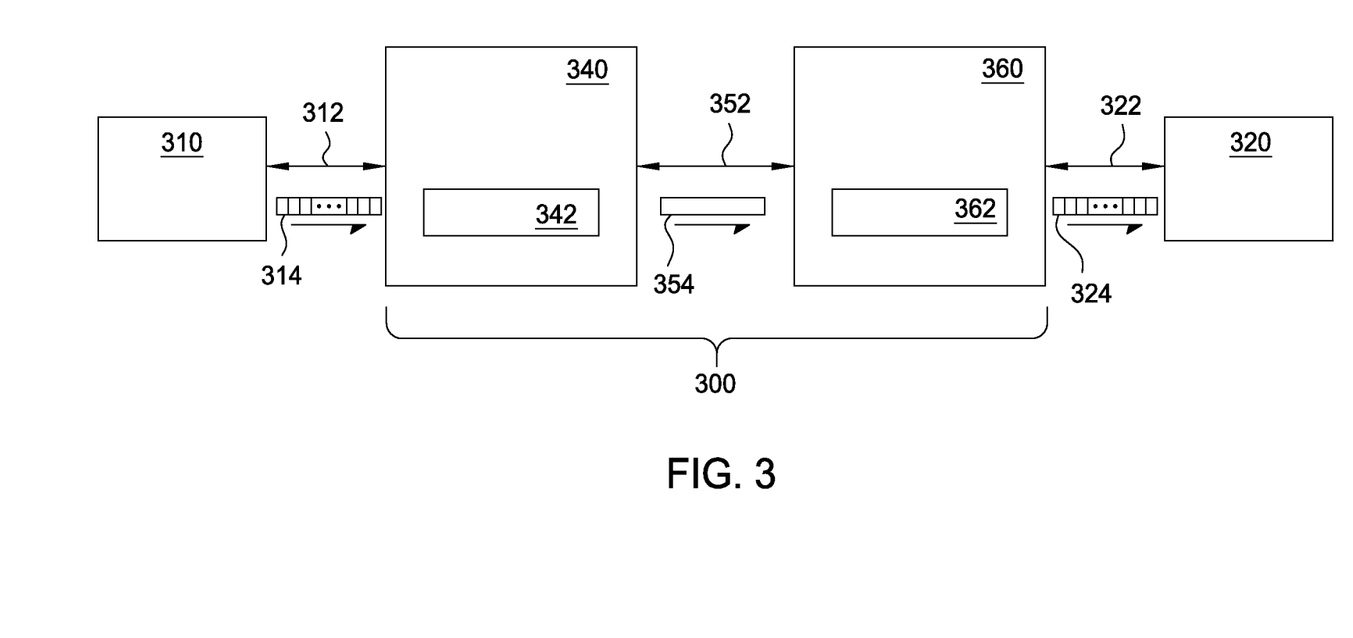
FIG. 3 is a conceptual diagram that illustrates a portion of the wireless mesh network of FIG. 1, according to one embodiment of the present invention.

FIG. 3 is a conceptual diagram that illustrates a portion 300 of the wireless mesh network 102 of FIG. 1, according to one embodiment of the present invention. As shown, portion 300 includes a node 340 coupled to a node 360 by a communication link 352. Nodes 340 and 360 may each be one of nodes 110, 112, or 130 shown in FIG. 1. Communication link 354 may be one of communication links 132, 134, 136, or a sequence of such communication links coupled together via one or more intermediate nodes.

As also shown, a device 310 is coupled to node 340 by a communication link 312, and a device 320 is coupled to node 360 by a communication link 322. Device 310 and device 320 may be computing and/or communication devices that are configured to communicate with one another according to a latency-sensitive communication protocol. In one embodiment, the latency sensitive communication protocol is a "mirrored Bits™" protocol, as is known in the art. In a further embodiment, devices 310 and 320 may each represent a serial device configured to implement the mirrored Bits™ protocol, and communication links 312 and 322 may each represent a serial communication link.

In general, the implementation of the latency-sensitive communication protocol may rely on a given device 310 or 320 receiving data from the other device at a specific frequency and/or data rate. For example, the latency-sensitive communication protocol may be implemented when device 320 receives a continuous stream of data that originates from device 310. Device 320 may verify that a communication pathway to device 310 is active by determining that the continuous stream of data includes an N-bit sequence that repeats with at least a threshold frequency, where N is an integer.

Portion 300 of the wireless mesh network 102 is configured to implement the latency-sensitive communication protocol on behalf of devices 310 and 320 in order to allow device 310 to communicate with device 320, and vice versa, across that portion 300. Conceptually, portion 300 may act as a communication pathway that mimics the operation of a direct communication link between devices 310 and 320 that is configured to implement the latency-sensitive communication protocol. For example, portion 300 could mimic the operation of a serial data link between devices 310 and 320 that is configured to implement the mirrored Bits™ protocol mentioned above.

Portion 300 is configured to initialize data communications between device 310 and device 320 when implementing the latency-sensitive communication protocol, as described in greater detail below. Portion 300 is also configured to maintain ongoing data communications between those devices, as well as to terminate data communication between those devices, as also described in greater detail below.

When initializing data communication between devices 310 and 320, node 340 within portion 300 may receive a continuous stream of data from device 310 that includes a repeating sequence of N bits, shown in FIG. 3 as bit stream 314. N may be any integer (such as, e.g., 32). Bit stream 314 may adhere to the latency-sensitive communication protocol, such as the mirrored Bits™ protocol mentioned above, among others. Node 340 is configured to analyze bit stream 314 and to extract the N-bit sequence from bit stream 314. Node 340 may then store that N-bit sequence within a template 342. Template 342 may reside within a memory unit included within node 340 (not shown here), such as, e.g., memory 212 or memory 216 shown in FIG. 2. When initially storing the N-bit sequence within template 342, node 340 transmits a packet 354 to node 360 one or more times that includes the N-bit sequence.

Node 360 is configured to receive packet 354 and to extract the N-bit sequence. Node 360 may then store the N-bit sequence within a template 362. Similar to template 342 discussed above, template 362 may reside within a memory unit included within node 360 (not shown here), such as, e.g., memory 212 or memory 216 shown in FIG. 2. Node 360 may then generate a stream of continuous bits that includes a repeating sequence of N-bits derived from the N-bit sequence stored within template 362. The stream of continuous bits generated by node 360 is shown in FIG. 3 as bit stream 324. Similar to bit stream 314, bit stream 324 may adhere to the latency-sensitive communication protocol discussed above. Device 320 is configured to receive bit stream 324 from node 360, and to operate as device 320 normally would when communicating directly with device 310 according to the latency-sensitive communication protocol.

As mentioned above, portion 300 is also configured to maintain ongoing data communications between devices 310 and 320. In doing so, node 340 within portion 300 may periodically transmit packet 354 to node 360 that includes the N-bit sequence. In one embodiment, this periodic transmission of packet 354 represents a "heartbeat" signal that node 360 may rely upon to verify that communication link 354 is still active. In practice, the frequency with which node 340 transmits packet 354 is significantly less than the frequency and/or data rate associated with bit streams 314 and 324. With this approach, the bandwidth required for communication between nodes 340 and 360, and, thus, devices 310 and 320, is significantly less than the bandwidth normally required to implement the latency-sensitive communication protocol, e.g. in a conventional communication link configured to implement that protocol.

Portion 300 is also configured to maintain ongoing data communication between devices 310 and 320 by propagating changes in bit stream 314 to device 320. In doing so, node 340 may continuously analyze bit stream 314 and determine whether the repeating N-bit sequence within that bit stream is different than the N-bit sequence stored within template 342. When node 340 determines that the N-bit sequence within bit stream 314 is different than that stored within template 342, i.e. the N-bit sequence within bit stream 314 has changed, node 340 may then update template 342 to reflect the new N-bit sequence. Node 340 may then transmit another packet 354 to node 360 that includes the new N-bit sequence. Node 360 is configured to receive that packet, extract the new N-bit sequence included therein, and then update template 362, in similar fashion as described above. Node 360 may then modify bit stream 324 to include a repeating sequence of N-bits based on the new N-bit sequence stored within template 362. With this approach, nodes 340 and 360 are configured to propagate changes in bit stream 314 to device 320, thereby mimicking a direct communication pathway between devices 310 and 320 configured to implement the latency-sensitive communication protocol.

Portion 300 may also terminate data communications between devices 310 and 320. For example, in situations where device 310 stops transmitting bit stream 314, node 340 may notify node 360 that node 340 no longer receives bit stream 314 from device 310. Node 360 may then terminate the transmission of bit stream 324. Node 360 may also be configured to terminate the transmission of bit stream 324 when packet 354 is not received by node 360 after a threshold amount of time. For example, node 360 may expect packet 354 to be received every M seconds. However, if node 360 does not receive packet 354 after 2*M seconds, then node 360 may determine that communication link 354 has been disrupted and, in response, terminate the transmission of bit stream 324.

When device 320 no longer receives bit stream 324, device 320 may then initiate some action to re-establish communications with device 310, report the loss of the communication pathway between those devices, and so forth. Nodes 340 and 360 may likewise take action to re-establish communication link 354 with one another or report the disruption of that communication link.

By implementing the various approaches described above, portion 300 of the wireless network 102 shown in FIG. 1 may be configured to transport data between devices 310 and 320 according to the latency-sensitive communication protocol. By mimicking that protocol, a network of devices (e.g. devices 310 and 320) that are configured to communicate with one another via the latency-sensitive communication protocol may be retrofitted to communicate with one another across the wireless mesh network 102. In some situations, portion 300 of the wireless mesh network 102 may have a higher latency or lower reliability than the latency and/or reliability normally required by the low-latency communication protocol. However, the aforementioned techniques allow that portion 300 to implement the latency-sensitive communication protocol despite those latency and reliability differences.

Figure 4:
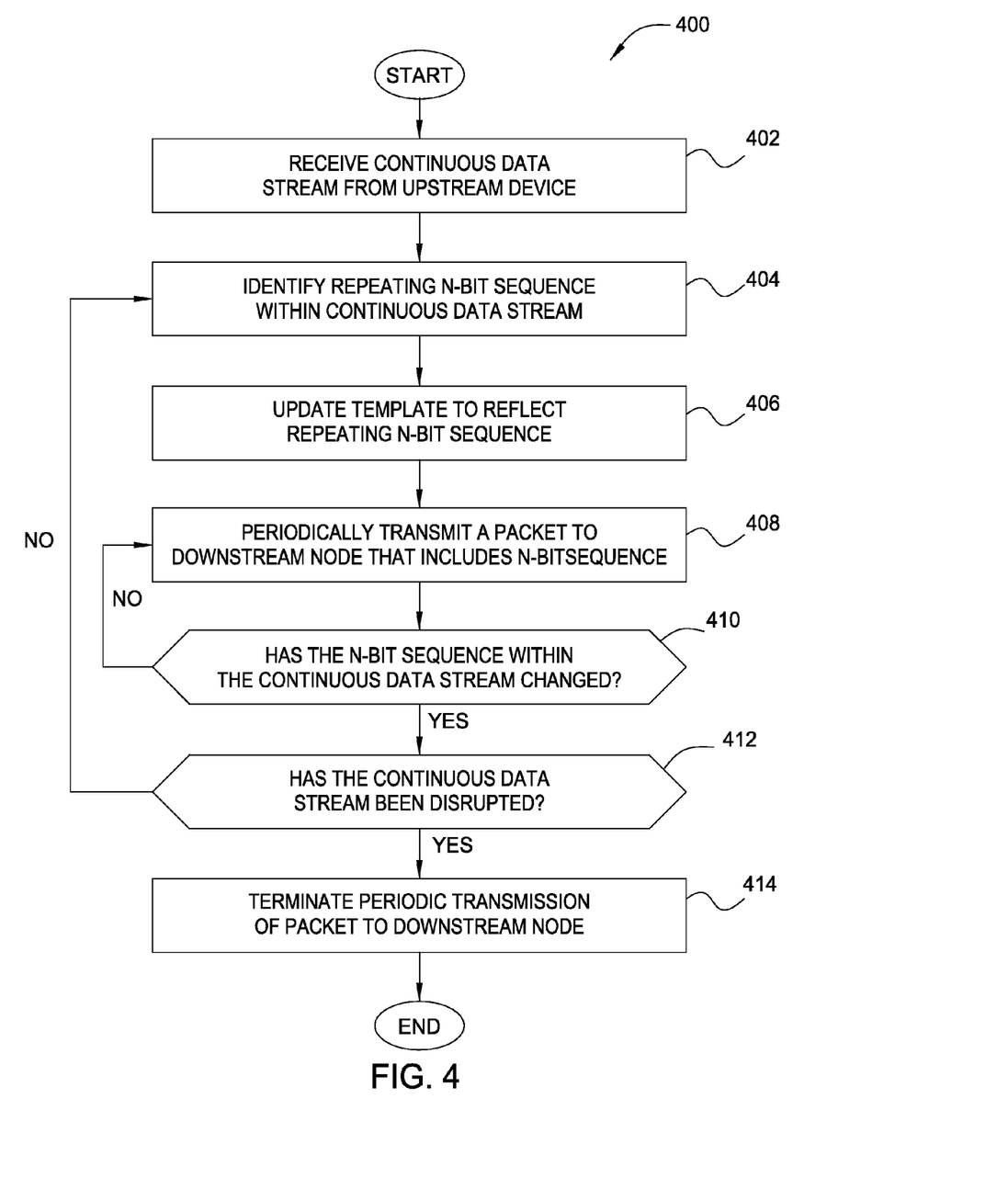
FIG. 4 is a flow diagram of method steps for implementing a first portion of a latency-sensitive communication protocol in a wireless mesh network, according to one embodiment of the present invention.

FIG. 4 is a flow diagram of method steps for implementing a first portion of a latency-sensitive communication protocol within portion 300 of wireless mesh network 102, shown in FIG. 3, according to one embodiment of the present invention. Although the method steps are described in conjunction with the systems of FIGS. 1-3, persons skilled in the art will understand that any system configured to perform the method steps, in any order, is within the scope of the present invention.

As shown, a method 400 begins at step 402, where node 340 receives a continuous data stream from device 310 that includes a repeating N-bit sequence. The continuous data stream received by node 340 from device 310 is shown in FIG. 3 as bit stream 314. The continuous data stream may adhere to a latency-sensitive communication protocol, such as, e.g., the mirrored Bits™ protocol.

At step 404, node 340 identifies the repeating N-bit sequence within bit stream 314. At step 402, node 340 updates template 342 to reflect the N-bit sequence. Template 342 may reside within a memory unit included within node 340, such as, e.g. memory 212 or 216 shown in FIG. 2. At step 408, node 340 periodically transmits packet 354 to node 360 that includes the N-bit sequence. Node 340 may transmit packet 354 one or more times in succession or may transmit packet 354 with a given frequency. In general the frequency with which node 340 transmits packet 354 is less than a data rate associated with bit stream 314.

At step 410, node 340 determines whether the N-bit sequence within bit stream 314 has changed. In doing so, node 340 may monitor bit stream 314 and periodically extract the N-bit sequence. Node 340 may then compare the extracted N-bit sequence to that stored within template 342 and determine whether the two N-bit sequences are the same or different. At step 410, if node 340 determines that the N-bit sequence within bit stream 314 has not changed, then the method 400 returns to step 408 and node 340 continues to periodically transmit packet 354 to node 360. Otherwise, if node 340 determines that the N-bit sequence within bit stream 314 has changed, then the method 400 proceeds to step 412, where node 340 determines whether the bit stream 314 received from device 310 has been disrupted.

At step 412, if node 340 determines that bit stream 314 has not been disrupted, meaning that bit stream 314 is still being received but that the N-bit pattern within bit stream 314 has changed, then the method 400 returns to step 404 and proceeds as described above. Specifically, node 340 may identify the new N-bit sequence within bit stream 314 at step 404, update template 342 at step 406, then periodically transmit packet 354 to node 360 that includes the new N-bit sequence. Node 340 may also immediately transmit a packet 354 that reflects the new N-bit sequence and then repeatedly transmit that packet 354 with an elevated frequency, for a given period of time, in order to ensure that node 360 receives the new N-bit sequence and can initiate necessary changes as quickly as possible, thereby minimizing the amount of time that nodes 340 and 360 are "out of sync."

At step 412, if node 340 determines that bit stream 314 has been disrupted, then the method 400 proceeds to step 414, where node 340 terminates the periodic transmission of packet 354 to node 360. Node 340 may also notify node 360 that communications with device 310 have been disrupted.

Figure 5:
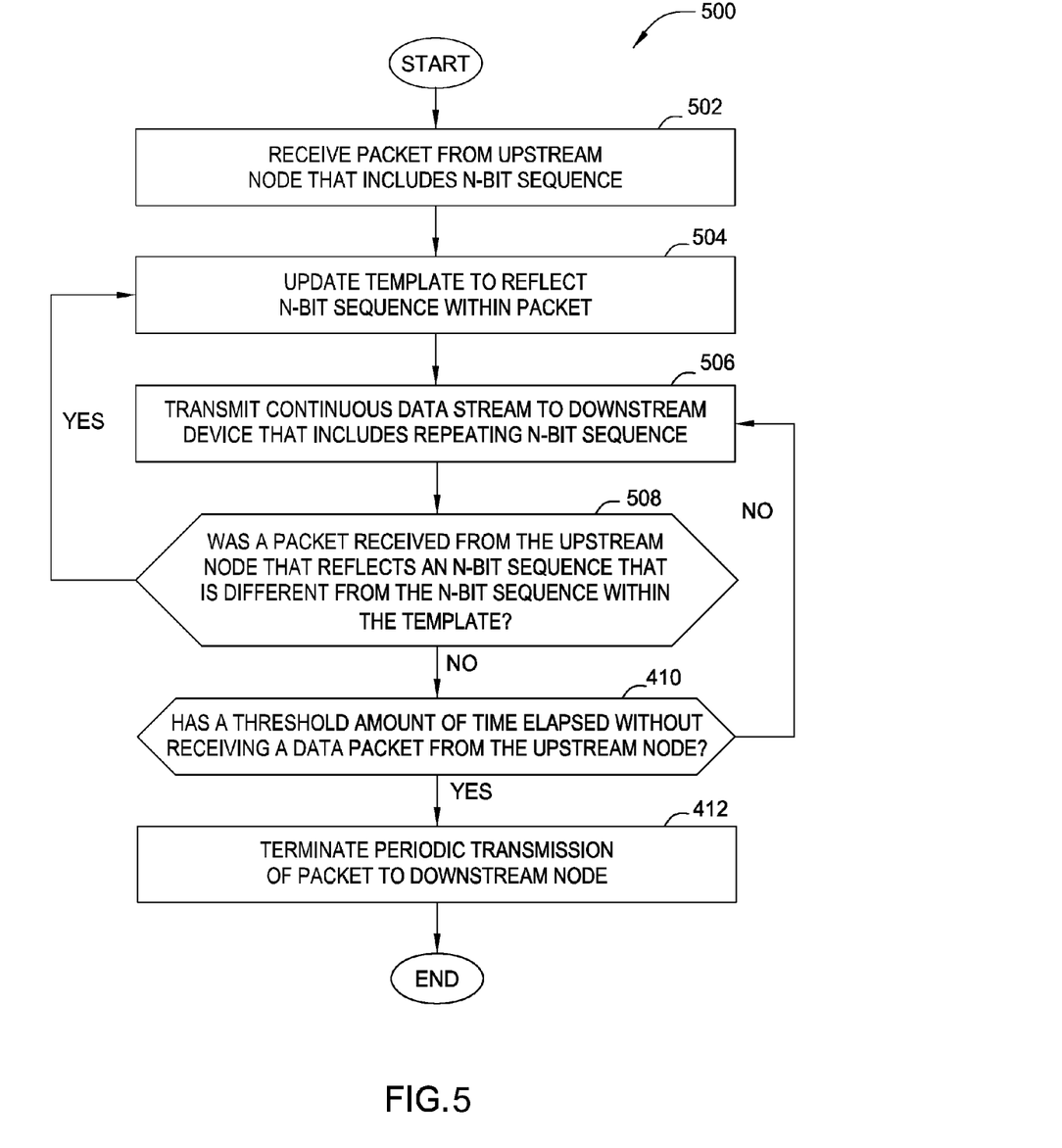
FIG. 5 is a flow diagram of method steps for implementing a second portion of a latency-sensitive communication protocol in a wireless mesh network, according to another embodiment of the present invention.

Node 340 may implement the method 400 in order to implement a portion of the latency-sensitive communication protocol. FIG. 5, described in greater detail below, illustrates a technique that may be performed by node 360 in order to implement another portion of the latency-sensitive communication protocol.

FIG. 5 is a flow diagram of method steps for implementing a second portion of a latency-sensitive communication protocol within portion 300 of wireless mesh network 102, shown in FIG. 3, according to another embodiment of the present invention. Although the method steps are described in conjunction with the systems of FIGS. 1-3, persons skilled in the art will understand that any system configured to perform the method steps, in any order, is within the scope of the present invention.

As shown, a method 500 begins at step 502, where node 360 receives packet 354 from node 340. Packet 354 includes an N-bit sequence of bits associated with a latency-sensitive communication protocol, as previously discussed. At step 504, node 360 updates template 362 to reflect the N-bit sequence within packet 354. Template 362 may reside within a memory unit included within node 360, such as, e.g. memory 212 or 216 shown in FIG. 2

At step 506, node 360 transmits a continuous data stream to device 320 that includes a repeating N-bit sequence derived from the N-bit sequence stored within template 362. The continuous data stream transmitted by node 360 is shown in FIG. 3 as bit stream 324. At step 508, node 360 determines whether a packet (such as e.g. packet 354 shown in FIG. 3) was received from node 340 that includes an N-bit sequence that is different from the N-bit sequence stored within template 362. If node 360 determines that a packet was received that includes an N-bit sequence that is different from the N-bit sequence stored within template 362, then the method 500 returns to step 504, where node 360 updates template 362 to reflect the new N-bit sequence. The method 500 then proceeds as described above.

At step 508, if node 360 determines that a packet was not received that includes an N-bit sequence that is different from the N-bit sequence stored within template 362, then the method 500 proceeds to step 510. At step 510, node 360 determines whether a threshold amount of time has elapsed since receiving a packet from node 340. In one embodiment, node 360 may expect a packet from node 340 every M seconds, and the threshold amount of time may be 2*M seconds. If node 360 determines that the threshold amount of time has not elapsed, then the method 500 returns to step 506 and proceeds as described above. Otherwise, if node 360 determines at step 510 that the threshold amount of time has elapsed, then the method 500 proceeds to step 512. At step 512, node 360 terminates the transmission of bit stream 324 to device 320. Device 320 may then initiate some action to re-establish communications with device 310, report the loss of the communication pathway between those devices, and so forth.

Node 360 may implement the method 500 in order to implement another portion of the latency-sensitive communication protocol, in conjunction with node 340 implementing the portion of the latency-sensitive communication protocol associated with the method 400 discussed above in conjunction with FIG. 4. Again, node 340 and node 360 operate in conjunction with one another to implement the latency-sensitive communication protocol. In one embodiment, each of nodes 340 and 360 may implement the methods 400 and 500 described above in conjunction with FIGS. 4 and 5, respectively, in order to implement both portions of the latency-sensitive communication protocol. With this approach, nodes 340 and 360 within portion 300 of the wireless mesh network 102 may cause that portion 300 to operate as a communication pathway between devices 310 and 320 that mimics a direct communication pathway configured to implement the latency-sensitive communication protocol discussed herein.

In sum, a wireless mesh network is configured to implement a latency-sensitive communication protocol in order to facilitate data communications between devices coupled to that network and configured to communicate with one another based on that protocol. Specifically, a node within the wireless mesh network receives a continuous stream of data that includes an N-bit sequence from an upstream device coupled to the wireless mesh network. The node transmits the N-bit sequence to a downstream node within the wireless mesh network. The downstream node re-creates the continuous stream of bits based on the received N-bit sequence, and then transmits the re-created continuous stream of bits to another device coupled to the wireless mesh network. By operating in conjunction with one another, the nodes within the wireless mesh network facilitate communication between the devices coupled to wireless mesh network according to the latency-sensitive communication protocol.

Advantageously, a network of devices configured to communicate with one another according to the latency-sensitive communication protocol may be retrofitted to communicate with one another across a wireless mesh network, thereby reducing the bandwidth and reliability required to communicate according to that protocol.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

The invention claimed is:

1. A computer-implemented method for transmitting data across a network according to a communication protocol, the method comprising:
   receiving, at a first node within the network and with a first data rate, a first stream of bits from a first device that includes repeating instances of a first N-bit sequence, N being a positive integer;
   extracting, at the first node, the first N-bit sequence from the first stream of bits; and
   transmitting a first data packet that includes fewer than the number of the repeating instances of the first N-bit sequence in the first stream from the first node to a second node within the network and with a second data rate that is lower than the first data rate and indicates that a communication link between the first node and the second node remains active, wherein the second node is coupled to a second device and is configured to transmit a second stream of bits to the second device that includes repeating instances of the first N-bit sequence.

2. The computer-implemented method of claim 1, further comprising:
   storing the first N-bit sequence within a memory unit;
   extracting a second N-bit sequence from the first stream of bits;
   determining that the second N-bit sequence is different than the first N-bit sequence stored within the memory unit;
   storing the second N-bit sequence within the memory unit; and
   transmitting a second data packet to the second node that includes the second N-bit sequence.

3. The computer-implemented method of claim 2, wherein the second node is configured to receive the second data packet, extract the second N-bit sequence from the second data packet, and transmit a third stream of bits to the second device that includes repeating instances of the second N-bit sequence.

4. The computer-implemented method of claim 1, further comprising transmitting the first data packet to the second node periodically according to a first time interval.

5. The computer-implemented method of claim 4, wherein, upon determining that the first data packet is not received within a second time interval, the second node is configured to stop transmitting the second stream of bits.

6. The computer-implemented method of claim 1, wherein each of the first device and the second device comprises a serial communication device, and the second node is coupled to the second device by a serial communication link.

7. The computer-implemented method of claim 1, wherein the communication protocol comprises a mirrored Bits™ protocol.

8. A non-transitory computer-readable medium storing program instructions that, when executed by a processing unit, causes the processing unit to transmit data across a network according to a communication protocol by performing the steps of:
receiving, at a first node within the network and with a first data rate, a first stream of bits from a first device that includes repeating instances of a first N-bit sequence, N being a positive integer;
extracting, at the first node, the first N-bit sequence from the first stream of bits; and
transmitting a first data packet that includes fewer than the number of the repeating instances of the first N-bit sequence in the first stream from the first node to a second node within the network and with a second data rate that is lower than the first data rate and indicates that a communication link between the first node and the second node remains active, wherein the second node is coupled to a second device and is configured to transmit a second stream of bits to the second device that includes repeating instances of the first N-bit sequence.

9. The non-transitory computer-readable medium of claim 8, further comprising the steps of:
storing the first N-bit sequence within a memory unit;
extracting a second N-bit sequence from the first stream of bits;
determining that the second N-bit sequence is different than the first N-bit sequence stored within the memory unit;
storing the second N-bit sequence within the memory unit; and
transmitting a second data packet to the second node that includes the second N-bit sequence.

10. The non-transitory computer-readable medium of claim 9, wherein the second node is configured to receive the second data packet, extract the second N-bit sequence from the second data packet, and transmit a third stream of bits to the second device that includes repeating instances of the second N-bit sequence.

11. The non-transitory computer-readable medium of claim 8, further comprising the step of transmitting the first data packet to the second node periodically according to a first time interval.

12. The non-transitory computer-readable medium of claim 11, wherein, upon determining that the first data packet is not received within a second time interval, the second node is configured to stop transmitting the second stream of bits.

13. The non-transitory computer-readable medium of claim 8, wherein each of the first device and the second device comprises a serial communication device, and the second node is coupled to the second device by a serial communication link.

14. The non-transitory computer-readable medium of claim 8, wherein the communication protocol comprises a mirrored Bits™ protocol.

15. A computing device configured to transmit data across a network according to a communication protocol, including:
a processing unit configured to:
receive, at a first node within the network and with a first data rate, a first stream of bits from a first device that includes repeating instances of a first N-bit sequence, N being a positive integer;
extract, at the first node, the first N-bit sequence from the first stream of bits; and
transmit a first data packet that includes fewer than the number of the repeating instances of the first N-bit sequence in the first stream from the first node to a second node within the network and with a second data rate that is lower than the first data rate and indicates that a communication link between the first node and the second node remains active, wherein the second node is coupled to a second device and is configured to transmit a second stream of bits to the second device that includes repeating instances of the first N-bit sequence.

16. The computing device of claim 15, further including:
a memory unit coupled to the processing unit and storing program instructions that, when executed by the processing unit, cause the processing unit to:
receive the first stream of bits from the first device;
extract the first N-bit sequence from the first stream of bits; and
transmit the first data packet that includes the first N-bit sequence to the second node.

17. The computing device of claim 16, wherein the processing unit is further configured to:
store the first N-bit sequence within the memory unit;
extract a second N-bit sequence from the first stream of bits;
determine that the second N-bit sequence is different than the first N-bit sequence stored within the memory unit;
store the second N-bit sequence within the memory unit; and
transmit a second data packet to the second node that includes the second N-bit sequence.

18. The computing device of claim 17, wherein the second node is configured to receive the second data packet, extract the second N-bit sequence from the second data packet, and transmit a third stream of bits to the second device that includes repeating instances of the second N-bit sequence.

19. A system for retrofitting a first network to transmit data across a second network according to a communication protocol, including:
a first node that resides within the second network and is configured to:
receive, at a first node and with a first data rate, a first stream of bits from a first device within the first network that includes repeating instances of a first N-bit sequence, N being a positive integer;

extract, at the first node, the first N-bit sequence from the first stream of bits; and transmit a first data packet that includes fewer than the number of the repeating instances of the first N-bit sequence in the first stream to a second node within the second network that is coupled to a second device within the first network; and the second node that resides within the second network and is configured to:

receive, at the second node and with a second data rate that is lower than the first data rate and indicates that a communication link between the first node and the second node remains active, the first data packet, extract, at the second node, the first N-bit sequence from the first data packet, and transmit a second stream of bits to the second device within the first network that includes repeating instances of the first N-bit sequence.

20. The system of claim 19, wherein the communication protocol comprises a mirrored Bits™ protocol.

21. The computer-implemented method of claim 1, wherein the first stream of bits and the second stream of bits are transmitted according to the first data rate, the first data packet is transmitted according to the second data rate to conserve bandwidth between the first node and the second node.

22. The non-transitory computer-readable medium of claim 8, wherein the first stream of bits and the second stream of bits are transmitted according to the first data rate, the first data packet is transmitted according to the second data rate to conserve bandwidth between the first node and the second node.

23. The computing device of claim 15, wherein the first stream of bits and the second stream of bits are transmitted according to the first data rate, the first data packet is transmitted according to the second data rate to conserve bandwidth between the first node and the second node.

24. The computing device of claim 19, wherein the first stream of bits and the second stream of bits are transmitted according to the first data rate, the first data packet is transmitted according to the second data rate to conserve bandwidth between the first node and the second node.

25. The computer-implemented method of claim 1, further comprising temporarily increasing the second data rate to a third data rate in response to the first node receiving a second N-bit sequence, wherein increasing the second data rate reduces an amount of time that the first node and the second node are not synchronized.

* * * * *

UNITED STATES PATENT AND TRADEMARK OFFICE
CERTIFICATE OF CORRECTION

PATENT NO. : 9,749,253 B2   Page 1 of 1
APPLICATION NO. : 13/828437
DATED : August 29, 2017
INVENTOR(S) : Brian Matsuo, Peter Hunt and Jana Van Greunen It is certified that error appears in the above-identified patent and that said Letters Patent is hereby corrected as shown below:

In the Claims

Column 11, Claim 7, Line 21, please delete "Bits™" and insert --bits™--;

Column 12, Claim 14, Line 11, please delete "Bits™" and insert --bits™--;

Column 13, Claim 20, Line 19, please delete "Bits™" and insert --bits™--.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*